United States Patent
Sivaraj et al.

(10) Patent No.: US 10,383,027 B1
(45) Date of Patent: Aug. 13, 2019

(12)

(54) PROXY ADVERTISEMENTS IN MULTIHOMED NETWORKS

(71) Applicant: Juniper Networks, Inc., Sunnyvale, CA (US)

(72) Inventors: SelvaKumar Sivaraj, Sunnyvale, CA (US); Wen Lin, Andover, MA (US); Ryan Bickhart, San Francisco, CA (US); Prabakaran Arumugam, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/934,794

(22) Filed: Mar. 23, 2018

(51) Int. Cl.
| | | |
|---|---|---|
| *H04L 12/46* | (2006.01) | |
| *H04L 12/721* | (2013.01) | |
| *H04W 40/14* | (2009.01) | |
| *H04L 29/08* | (2006.01) | |
| *H04W 40/28* | (2009.01) | |
| *H04L 12/707* | (2013.01) | |
| *H04W 60/00* | (2009.01) | |

(52) U.S. Cl.
CPC ............ *H04W 40/14* (2013.01); *H04L 45/22* (2013.01); *H04L 45/66* (2013.01); *H04L 67/28* (2013.01); *H04W 40/28* (2013.01); *H04W 60/005* (2013.01)

(58) Field of Classification Search
CPC ............... H04L 61/103; H04L 61/2007; H04L 61/6022; H04L 45/66; H04L 45/22
See application file for complete search history.

(56) References Cited

U.S. PATENT DOCUMENTS

| | | | | |
|---|---|---|---|---|
| 9,559,951 | B1* | 1/2017 | Sajassi | H04L 45/66 |
| 2017/0195220 | A1* | 7/2017 | Sivaraj | H04L 45/66 |
| 2017/0317919 | A1* | 11/2017 | Fernando | H04L 61/103 |
| 2017/0373973 | A1* | 12/2017 | Bickhart | H04L 12/4641 |
| 2019/0052559 | A1* | 2/2019 | Velayudhan | H04L 45/28 |

OTHER PUBLICATIONS

Executive: "White Paper Juniper Networks EVPN Implementation for Next-Generation Data Center Architectures," Jul. 2015, 62 pages, XP055367919, [retrieved on Apr. 26, 2017] Retrieved from the Internet: [URL:https://www.juniper.net/assets/us/en/local/pdf/whitepapers/2000606-en.pdf].

(Continued)

*Primary Examiner* — Rasheed Gidado
(74) *Attorney, Agent, or Firm* — Harrity & Harrity, LLP

(57) ABSTRACT

A provider edge device may receive a first MAC/IP route advertisement that identifies a MAC route, or a MAC and IP route, relating to an endpoint device. The provider edge device may generate and provide a MAC/IP route proxy advertisement based on the MAC route or the MAC and IP route, detect a potential decrease in reliability of the MAC route or the MAC and IP route, broadcast a request to verify the reliability of the MAC and IP route, determine whether the reliability of the MAC route, or the MAC and IP route, has decreased, and perform an action to cause withdrawal of the MAC/IP route proxy advertisement, or to cause a second MAC/IP route advertisement that identifies the MAC route, or the MAC and IP route, to be provided, based on determining whether the reliability of the MAC route, or the MAC and IP route, has decreased.

20 Claims, 8 Drawing Sheets

(56) References Cited

OTHER PUBLICATIONS

Extended European Search Report for Application No. EP18215776.8, dated Apr. 30, 2019, 11 pages.
Sajassi A., et al., "Provider Backbone Bridging Combined with Ethernet VPN (PBB-EVPN); rfc7623.txt," Internet Engineering Task Force (IETF), Sep. 22, 2015, pp. 1-23, 23XP015107687.
Sajassi A., et al., "RFC 7432—BGP MPLS-Based Ethernet VPN," Feb. 2015, 56 pages, XP055303848. [retrieved on Sep. 19, 2016] Retrieved from the Internet:[URL:https://tools.ietf.org/html/rfc7432].

\* cited by examiner

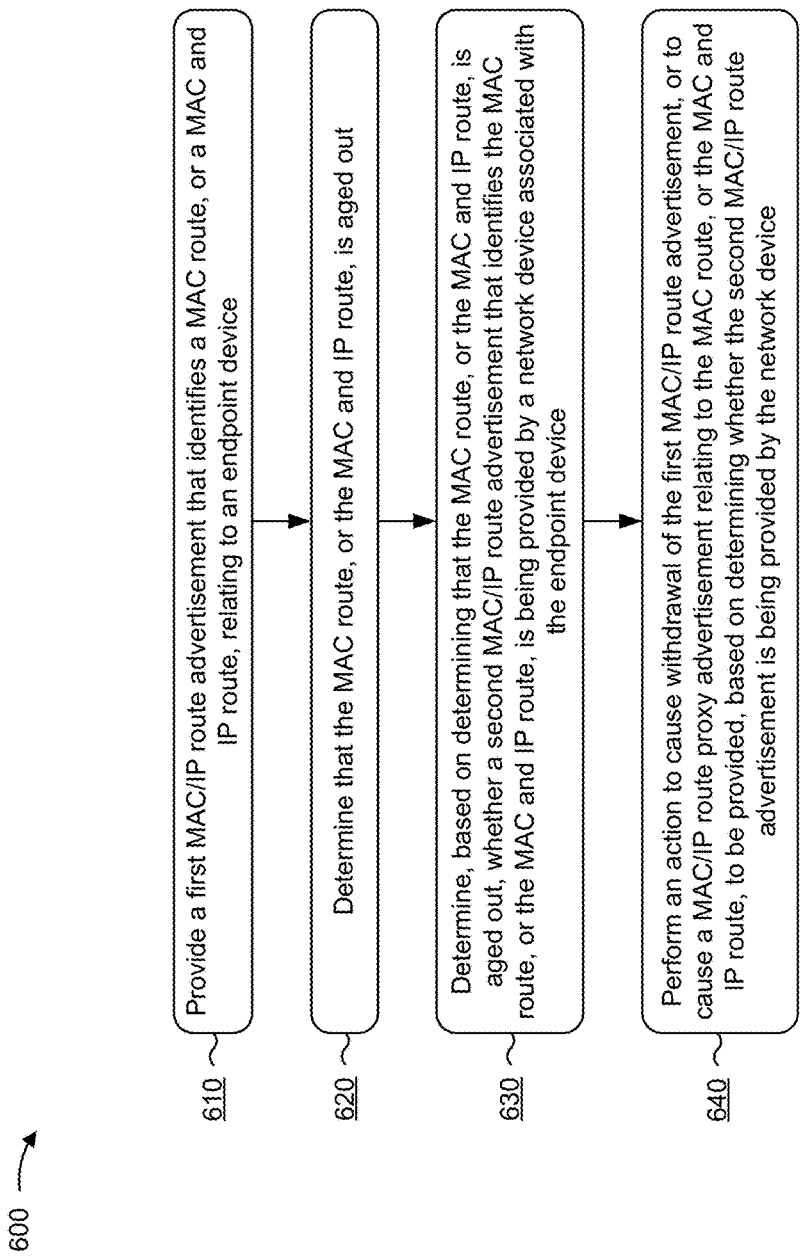

US 10,383,027 B1

PROXY ADVERTISEMENTS IN MULTIHOMED NETWORKS

BACKGROUND

Multihoming is the practice of connecting an endpoint device, a host, or a network to multiple networks, which can increase network connection reliability and/or performance. As one example, a mobile phone may be connected to both a long term evolution (LTE) network and a Wi-Fi network at the same time. As another example, an endpoint device (e.g., a customer edge (CE) device) may be connected to multiple, different provider edge (PE) devices simultaneously. Multihoming may increase reliability by providing multiple links for packets (e.g., Internet Protocol (IP) packets), so that if a link fails, the packets can be routed through other links.

SUMMARY

According to some implementations, a provider edge device may include one or more memories, and one or more processors to receive a first media access control (MAC)/Internet Protocol (IP) route advertisement. The first MAC/IP route advertisement may identify a MAC route, or a MAC and IP route, relating to an endpoint device. The one or more processors may generate and provide a MAC/IP route proxy advertisement based on the MAC route or the MAC and IP route, detect a potential decrease in reliability of the MAC route or the MAC and IP route, broadcast a request to verify the reliability of the MAC and IP route, determine, based on the request, whether the reliability of the MAC route, or the MAC and IP route, has decreased, and perform an action to cause withdrawal of the MAC/IP route proxy advertisement, or to cause a second MAC/IP route advertisement that identifies the MAC route, or the MAC and IP route, to be provided, based on determining whether the reliability of the MAC route, or the MAC and IP route, has decreased.

According to some implementations, a non-transitory computer-readable medium may store instructions. The instructions may include one or more instructions that, when executed by one or more processors of a network device, cause the one or more processors to receive a first media access control (MAC)/Internet Protocol (IP) route advertisement. The first MAC/IP route advertisement may identify a MAC route relating to a customer edge device. The instructions may cause the one or more processors to generate and provide a MAC/IP route proxy advertisement based on the MAC route, detect a potential decrease in reliability of the MAC route after generating and providing the MAC/IP route proxy advertisement, broadcast a request to verify the reliability of the MAC route after detecting the potential decrease in reliability of the MAC route, determine, based on the request, whether the reliability of the MAC route has decreased, and perform one or more actions to cause a second MAC/IP route advertisement, that identifies the MAC route, to be provided based on determining that the reliability of the MAC route has not decreased.

According to some implementations, a method may include providing, by a first network device, a first media access control (MAC)/Internet Protocol (IP) route advertisement. The first MAC/IP route advertisement may identify a MAC route or a MAC and IP route. The MAC route, or the MAC and IP route, may relate to an endpoint device. The method may include determining, by the first network device, that the MAC route, or the MAC and IP route, is aged out, and determining, by the first network device and based on determining that the MAC route, or the MAC and IP route, is aged out, whether a second MAC/IP route advertisement is being provided by a second network device associated with the endpoint device. The second MAC/IP route advertisement may identify the MAC route or the MAC and IP route. The method may include performing, by the first network device, an action to cause withdrawal of the first MAC/IP route advertisement, or to cause a MAC/IP route proxy advertisement relating to the MAC route, or the MAC and IP route, to be provided, based on determining whether the second MAC/IP route advertisement is being provided by the second network device.

BRIEF DESCRIPTION OF THE DRAWINGS

FIG. 6 is a flow chart of an example process relating to the example process of FIG. 5.

DETAILED DESCRIPTION

Figure 1A:
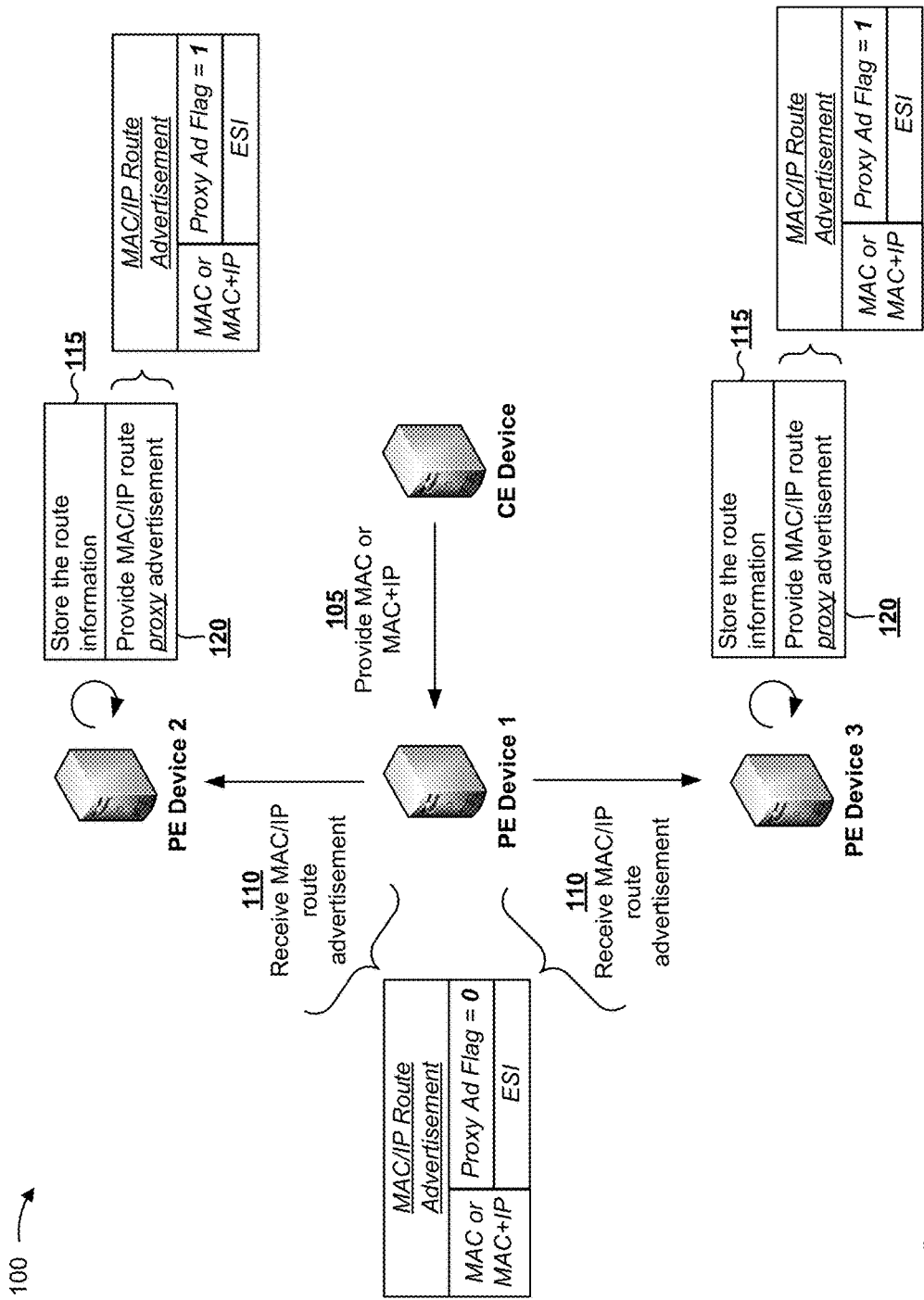
FIGS. 1A-1C are diagrams of an overview of an example implementation described herein.

The following detailed description of example implementations refers to the accompanying drawings. The same reference numbers in different drawings may identify the same or similar elements.

In some cases, an endpoint device, such as a customer edge (CE) device, may be homed to multiple provider edge (PE) devices in a network or subnet (e.g., an Ethernet virtual private network (EVPN), a virtual local area network (VLAN), etc.). In such cases, the PE devices may receive traffic from a provider network, and may route the network traffic to the CE device.

One example of a scheme for intersubnet forwarding is Multiprotocol Label Switching (MPLS), which is a type of data-carrying technique that directs data from one network node to the next network node based on path labels rather than network addresses, thereby avoiding complex lookups in a routing table. In an MPLS scheme, the labels identify virtual links (paths) between distant nodes (e.g., PE devices) rather than endpoints.

In performing intersubnet forwarding, a device may use layer 2 labels and/or layer 3 labels to route the network traffic, where layer 2 corresponds to the data link layer of the Open Systems Interconnection (OSI) model (e.g., an Ethernet layer), and layer 3 corresponds to the network layer of the OSI model (e.g., an IP layer).

For example, a layer 2 label may be associated with one or more PE devices, and may identify a media access control (MAC) lookup table based on which the PE devices are to identify next-hop information, such as a last hop, for a destination endpoint device, such as a CE device. Similarly, layer 3 labels may be associated with respective PE devices and may identify respective lookup tables (e.g., IP tables) based on which to identify next-hop information (e.g., a last hop) for a destination endpoint device, such as a CE device. A PE device may provide network layer reachability information (NLRI) regarding the route, for example, by advertising, as part of a Type 2 (MAC/IP) route advertisement, a layer 2 label, a layer 3 label, an IP address of the destination endpoint device, and/or a MAC address of the destination endpoint device (e.g., an address resolution protocol (ARP) binding-a MAC/IP binding-associated with the destination endpoint device), an Ethernet segment identifier (ESI) (e.g., that is unique to each EVPN instance, for example, to enable auto-discovery of Ethernet segments and Designated Forwarder (DF) election), and/or the like.

Prior to providing a Type 2 route advertisement, a PE device first "learns" the MAC and/or IP address of an endpoint device, such as a CE device. This typically occurs via normal data-plane learning mechanisms, where packets provided by the CE device in the data plane are received and hashed by a PE device. For example, in an EVPN network instance, where a particular CE device is homed to multiple PE devices, and in a case where the PE devices utilize ARP or neighbor discovery protocol (NDP) messages or requests to learn MAC/IP bindings relating to coupled CE devices, the response packet(s) provided by the particular CE device are often only hashed in one of the PE devices (and thus the MAC/IP binding or MAC/IP route is "locally" learned by only one of the PE devices). Similarly, in a case where the PE devices broadcast messages or requests (e.g., to one or more ports) to learn ARP/NDP addresses of coupled CE devices, under certain network traffic conditions, the response packet(s) provided by a particular CE device might only be hashed in one of the PE devices (and thus the MAC address or MAC route is "locally" learned by only one of the PE devices). In such cases, a PE device that locally learns the MAC address and/or the MAC/IP binding may advertise a Type 2 route (that includes next hop information set to the corresponding CE device). A Type 2 route advertisement serves to indicate, to other PE devices on the network or subnet, that the route is valid or active, and enables these PE devices to "remotely" learn the route information, and store or install the route information for packet forwarding purposes.

However, having only a single PE device advertise a Type 2 route for the CE device may negatively impact traffic forwarding to the CE device if the PE device experiences a failure or if a link between the PE device and the CE device is disrupted or fails. In particular, if a PE device fails, other PE devices on the same network or subnet (which might all be communicatively coupled to one another over one or more sessions via a border gateway protocol (BGP)) may detect the failure of the PE device, and may automatically remove or delete all route information that was installed based on Type 2 route advertisements previously provided by the PE device. If a link between the PE device and the CE device is disrupted or fails, the PE device may withdraw from advertising the route for the CE device. Such withdrawal may also cause the other PE devices to automatically remove or delete all route information that was installed based on Type 2 route advertisements previously provided by the PE device.

In either scenario, a flooding condition might subsequently occur if there is incoming traffic for the CE device. In such cases, the multihomed PE devices would have to relearn (e.g., via broadcast message(s), such as ARP and/or NDP messages) the MAC address and/or the MAC/IP binding of the CE device. This may take considerable time and result in traffic loss, which negatively impacts network efficiency and performance.

Some implementations, described herein, enable a multihomed PE device that remotely learns route information relating to an endpoint device, such as a CE device, to nevertheless advertise the route in a Type 2 route advertisement. To distinguish from a route advertisement in which the route is locally learned, the PE device is capable of adjusting a control flag (e.g., one bit)—e.g., a proxy advertisement flag—in an extended community attribute, such as a BGP extended community attribute, of the route advertisement so as to specify that the route advertisement is a proxy advertisement. A first PE device that locally learns route information may thus set the proxy advertisement flag to one value (e.g., to '0') to indicate that the route information is locally learned by the first PE device (and thus the route advertisement is not a proxy advertisement), and a second PE device that remotely learns the route (e.g., from the route advertisement provided by the first PE device) may set the proxy advertisement flag to another value (e.g., to '1') to indicate that the route is remotely learned by the second PE device (and thus the route advertisement is a proxy advertisement).

In this way, in a scenario where the first PE device fails, or where a link between the first PE device and the endpoint device fails, proxy advertisements from the second PE device may still continue to flow through the network, providing a grace period for PE devices on the network, such as the second PE device, to relearn (e.g., locally learn via broadcast message(s)) the route information relating to the endpoint device. This prevents PE devices (including those PE devices to which the endpoint device is not multihomed) from immediately removing or deleting route entries relating to the endpoint device (as would otherwise be the case if the first PE device is the only PE device that locally learned the route, and the first PE device fails or withdraws from advertising the route) if the route is actually still valid or active. This permits all PE devices on the network or subnet to continue to forward traffic to the endpoint device, which reduces the possibility of traffic loss, thereby improving overall network efficiency and performance. This is particularly beneficial in cases where large quantities of routes relating to numerous endpoint devices are involved, since unneeded disruption in traffic forwarding (e.g., due to widespread withdrawal of route advertisements and/or removal or deletion of route entries) would be avoided.

Figure 1B:
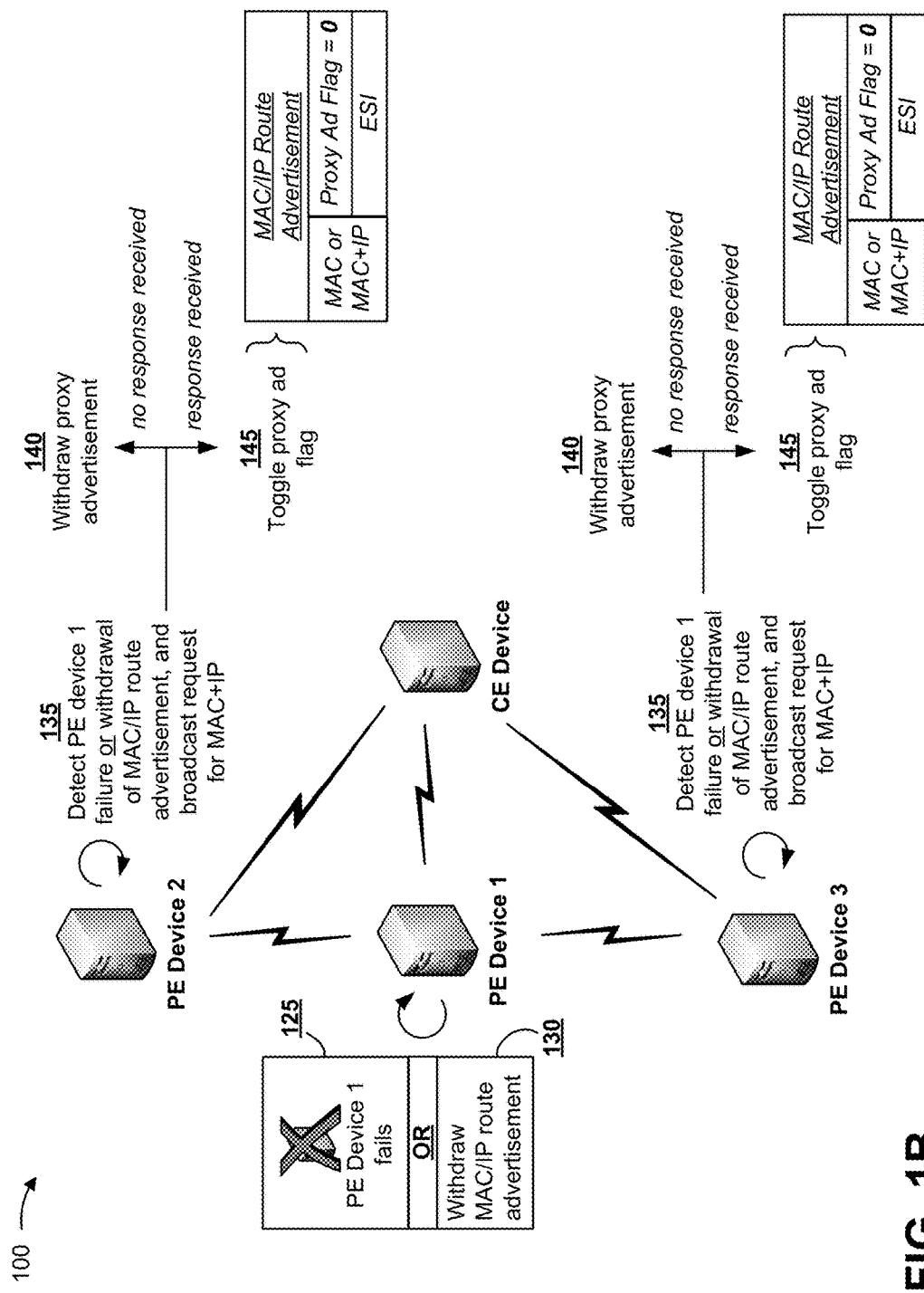
Figure 1C:
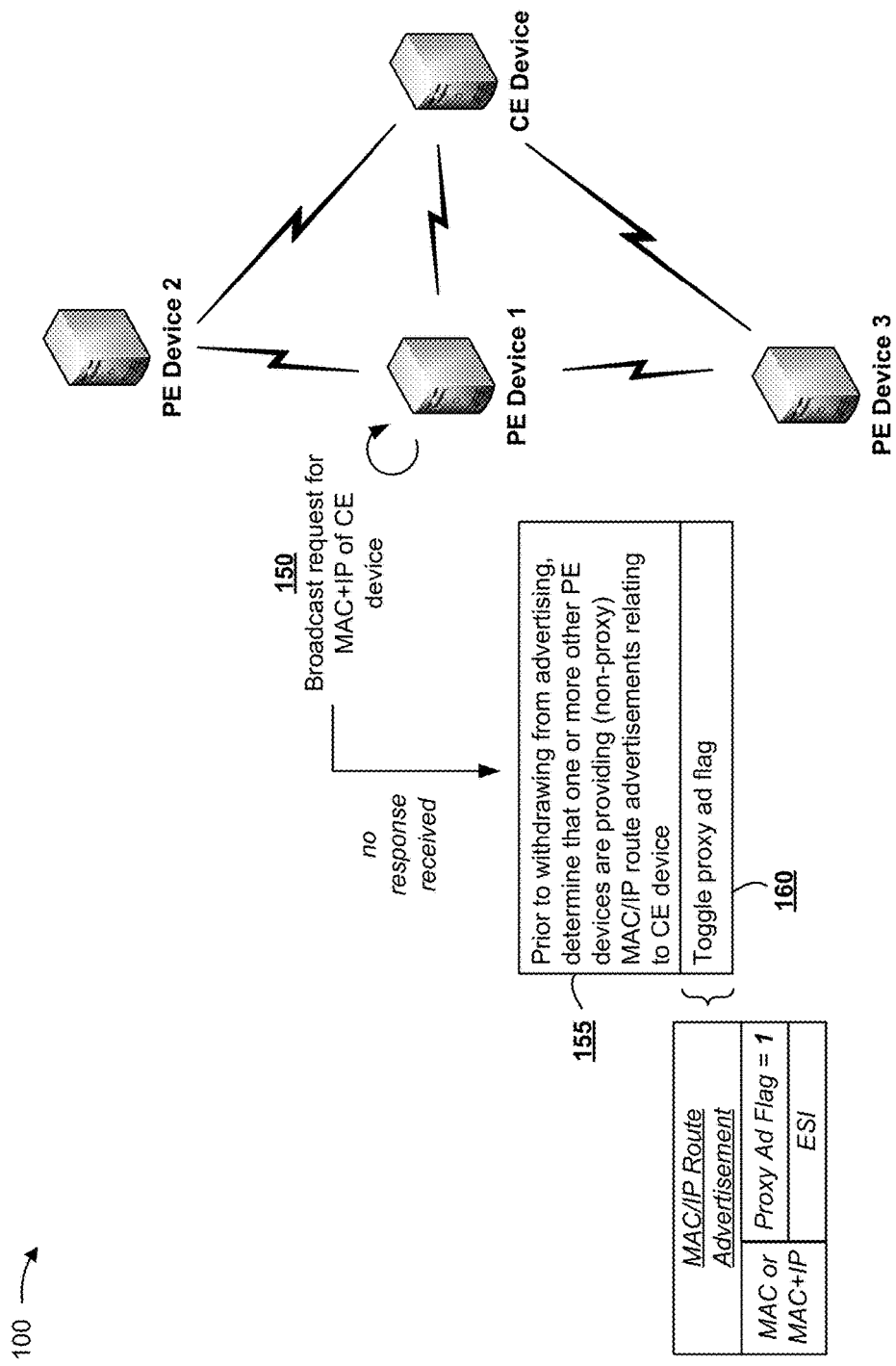

FIGS. 1A-1C are diagrams of an overview of an example implementation 100 described herein. As shown in FIGS. 1A-1C, example implementation 100 may include a CE device and PE devices 1, 2, and 3 communicatively coupled to the CE device. In some implementations, the CE device may be multihomed to PE devices 1, 2, and 3. In some implementations, the CE device may be multihomed to PE devices 1, 2, and 3 via an EVPN instance.

Although not shown, example implementation 100 may include one or more additional PE devices to which CE device may be homed. Additionally, or alternatively, example implementation 100 may include one or more additional PE devices on the same network or subnet as PE devices 1, 2, and 3, but not homed by the CE device.

Furthermore, although not shown, example implementation 100 may include one or more additional CE devices. In some cases, some or all of these CE devices may be communicatively coupled to one or more of PE devices 1, 2, or 3 and/or one or more additional PE devices.

As shown in FIG. 1A, and as shown by reference number 105, the CE device may provide information regarding a MAC address of the CE device or the MAC and IP addresses (MAC/IP binding information) of the CE device. In some implementations, the CE device may provide the information based on a request for MAC address information or MAC and IP address information. In some implementations, one or more of PE devices 1, 2, or 3 (or one or more other PE devices) may broadcast requests(s) for MAC and IP address information relating to the CE device (and/or relating to one or more other CE devices).

Here, PE device 1 may be the only multihomed device that receives the route information from the CE device. In some implementations, PE device 1 may store the information in one or more route entries in one or more data structures, such as forwarding table(s), accessible to PE device 1.

Although not shown, in some cases, one or more of PE devices 2 or 3 (and/or one or more additional PE devices) may receive the route information from the CE device, and store the information in respective forwarding tables.

As shown by reference number 110, PE device 1 may provide, and PE devices 2 and 3 may receive, a MAC/IP route advertisement (e.g., a Type 2 route advertisement). As shown, the MAC/IP route advertisement may include, among other information, the MAC address of the CE device (e.g., a MAC route) or the MAC and IP addresses of the CE device (e.g., a MAC and IP route or MAC/IP binding information), an ESI, and a value for a proxy advertisement flag.

In some implementations, the proxy advertisement flag may be a flag in the attributes control flags of the EVPN layer 2 attributes extended community. For example, the attributes control flags may be defined as two octets (e.g., 16 bits), where one or more available or unused reserved bits (e.g., one or more of the least significant bit of the two octets, the second least significant bit of the two octets, the third least significant bit of the two octets, the fourth least significant bit of the two octets, and/or the like) may, individually, or in combination, be defined as the proxy advertisement flag.

Here, as shown, the proxy advertisement flag may be defined as one bit, and is not set (e.g., the value may be '0') so as to indicate that the MAC/IP route advertisement relates to a route that is locally learned by PE device 1 (i.e., that the route advertisement is not a proxy advertisement).

Alternatively, the proxy advertisement flag may be configured such that setting the proxy advertisement flag (e.g., to '1') may indicate that the MAC/IP route advertisement relates to a route that is locally learned by PE device 1 (i.e., that the route advertisement is not a proxy advertisement).

As shown by reference number 115, PE devices 2 and 3 may store (e.g., install) information, contained in the MAC/IP route advertisement, in respective forwarding tables. As shown by reference number 120, PE devices 2 and 3 may provide MAC/IP route proxy advertisements based on the information.

As shown, each MAC/IP route proxy advertisement may include some or all of the information contained in the MAC/IP route advertisement provided by PE device 1, but may include a different value for the proxy advertisement flag-here, the proxy advertisement flag is set (e.g., the value may be '1') so as to indicate that the MAC/IP route advertisement relates to a route that is remotely learned by PE devices 2 or 3 (i.e., that the route advertisement is a proxy advertisement).

Alternatively, in a case where the configuration of the proxy advertisement flag is such that setting the proxy advertisement flag (e.g., to '1') indicates that the MAC/IP route advertisement relates to a route that is locally learned by PE device 1 (i.e., that the route advertisement is not a proxy advertisement), the proxy advertisement flag in the MAC/IP route proxy advertisement provided by PE devices 2 or 3 may not be set (e.g., the value may be '0') so as to indicate that the MAC/IP route proxy advertisement relates to a route that is remotely learned by PE devices 2 or 3 (i.e., that the route advertisement is a proxy advertisement).

In some implementations, PE devices 2 and 3 may each be configured to determine whether the ESI identified in the MAC/IP route advertisement, provided by PE device 1, is non-zero and local (e.g., has a "local presence") to PE devices 2 and 3, prior to providing MAC/IP route proxy advertisements. In some cases, if the ESI identified in a MAC/IP route advertisement is not local to a PE device, such as PE device 2 or PE device 3, the PE device may ignore the MAC/IP route advertisement, and may not proxy advertise the associated route.

In this way, only those PE devices to which a CE device is multihomed (e.g., attached), for example, may provide corresponding MAC/IP route proxy advertisements.

As shown in FIG. 1B, and as shown by reference numbers 125 and 130, PE device 1 may fail or may withdraw from advertising the MAC/IP route. In some cases, PE device 1 may, upon expiration of a timer (e.g., initiated when PE device 1 locally learned the route entry and/or the like), broadcast request(s) for MAC and IP address information relating to the CE device. If PE device 1 does not receive a response (e.g., within a threshold period of time), PE device 1 may permit the route information for the CE device to age out, and may withdraw from advertising the route.

As shown by reference number 135, PE devices 2 and 3 may each detect the failure of PE device 1 or the withdrawal from advertising by PE device 1, and broadcast an ARP/NDP request for MAC/IP address information relating to the CE device.

For example, the failure of PE device 1 and/or the withdrawal from the advertising of the MAC/IP route may indicate, to PE devices 2 and 3, that a reliability of routes identified in PE device 1's MAC/IP route advertisements (whether relating to the CE device or to other devices) has decreased (e.g., the CE device may no longer be reachable via the identified route), in which case PE devices 2 and 3 may broadcast request(s) to determine or verify whether the CE device (and/or other devices) is still active and/or connected to PE devices 2 and 3.

As shown by reference number 140, if PE device 2 does not receive a response (e.g., within a threshold period of time, such as 5 seconds, 3 seconds, 2 seconds, and/or the like) from the CE device, PE device 2 may withdraw from proxy advertising the MAC/IP route, and permit the route entry in PE device 2's forwarding table(s) to age out. Similarly, if PE device 3 does not receive a response from the CE device, PE device 3 may withdraw from proxy advertising the MAC/IP route, and permit the route entry in PE device 3's forwarding table(s) to age out.

As shown by reference number 145, if PE device 2 receives a response from the CE device, PE device 2 may adjust or toggle the proxy advertisement flag (e.g., from '1' to '0') to provide MAC/IP route advertisements that are not proxy advertisements (e.g., to indicate that PE device 2 has locally learned the route relating to the CE device). Similarly, if PE device 3 receives a response from the CE device, PE device 3 may adjust or toggle the proxy advertisement flag (e.g., from '1' to '0') to provide MAC/IP route advertisements that are not proxy advertisements (e.g., to indicate that PE device 3 has locally learned the route relating to the CE device).

In some cases, one of PE device 2 or PE device 3 (but not the other) may receive a response from the CE device. For example, only PE device 3 may receive a response from the CE device. In this case, PE device 3 may provide MAC/IP route advertisements that are non-proxy, and PE device 2 may, based on detecting such MAC/IP route advertisements from PE device 3, determine to continue to proxy advertise the MAC/IP route.

In some cases, after providing MAC/IP route advertisements as described above with respect to reference number 110, PE device 1 may (e.g., in connection with aging out the route entry relating to the CE device), as shown in FIG. 1C, and as shown by reference number 150, broadcast an ARP/NDP request for MAC/IP address information relating to the CE device.

In some implementations, if PE device 1 does not receive a response (e.g., within a threshold period of time, such as 5 seconds, 3 seconds, 2 seconds, and/or the like) from the CE device, the route entry relating to the CE device may be permitted to age out. Upon the route entry aging out or after the route entry ages out (e.g., upon, or after, PE device 1 determines that the route entry has aged out), PE device 1 may, prior to withdrawing from advertising of the route, determine whether one or more other PE devices (e.g., PE device 2 or 3) are providing non-proxy MAC/IP route advertisements relating to the CE device.

If PE device 1 determines (e.g., within a threshold period of time) that no other PE devices are providing non-proxy MAC/IP route advertisements, PE device 1 may initiate withdrawal of the advertising.

As shown by reference number 155, PE device 1 may, prior to withdrawing from advertising of the route, determine that one or more other PE devices (e.g., PE device 2 or 3) are providing non-proxy MAC/IP route advertisements relating to the CE device. In this case, and as shown by reference number 160, PE device 1 may refrain from withdrawing from advertising the route, and rather adjust or toggle the proxy advertisement flag (e.g., from '0' to '1') to provide MAC/IP route advertisements that are proxy advertisements. Thus, the route entry stored in PE device 1 may continue to be used by PE device 1 to forward traffic to the CE device.

In this way, in a scenario where a first PE device fails, or where a link between a first PE device and an endpoint device fails, proxy advertisements from a second PE device may still continue to flow through the network, providing a grace period for PE devices on the network, such as the second PE device, to relearn (e.g., locally learn via broadcast message(s)) the route information relating to the endpoint device. This prevents PE devices (including those PE devices to which the endpoint device is not multihomed) from immediately removing or deleting route entries relating to the endpoint device (as would otherwise be the case if the first PE device is the only PE device that is advertising the route, and the first PE device fails or withdraws from advertising the route) if the route is actually still valid or active. This permits all PE devices on the network or subnet to continue to forward traffic to the endpoint device, which reduces the possibility of traffic loss, thereby improving overall network efficiency and performance. In addition, this permits preservation of Type 2 routes for a longer period of time (thereby permitting (e.g., for layer 2 traffic) load balancing to continue among remaining (operating) PE devices, rather than directing all traffic to a new designated forwarder). This is particularly beneficial in cases where large quantities of routes relating to numerous endpoint devices are involved, since flooding and/or unneeded disruption in traffic forwarding (e.g., due to widespread withdrawal of route advertisements and/or removal or deletion of route entries) would be avoided.

As indicated above, FIGS. 1A-1C are provided merely as examples. Other examples are possible and may differ from what was described with regard to FIGS. 1A-1C.

Figure 2:
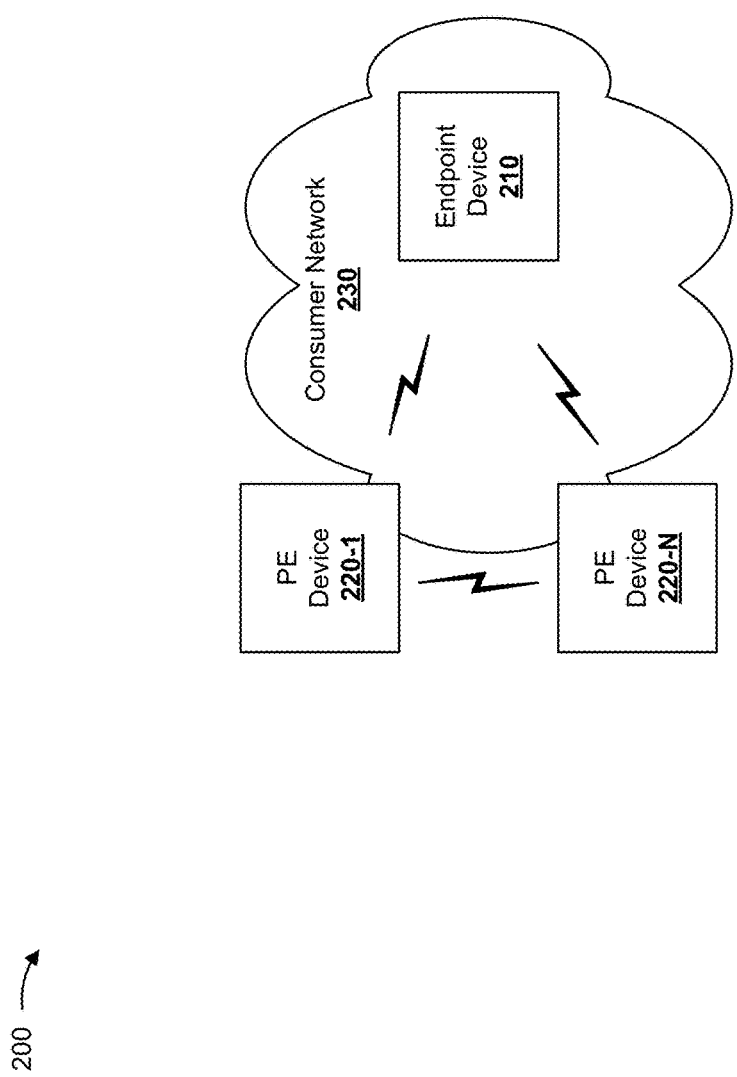
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an endpoint device 210, one or more PE devices 220-1 through 220-N (N≥1) (hereinafter referred to collectively as "PE devices 220," and individually as "PE device 220"), and a consumer network 230. Devices of environment 200 may interconnect via wired connections, wireless connections, or a combination of wired and wireless connections.

Endpoint device 210 includes one or more devices capable of receiving and/or providing information over a network—e.g., a provider network (not shown)—and/or capable of generating, storing, and/or processing information received and/or provided over the network. For example, endpoint device 210 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), or a similar device. Endpoint device 210 may act as an endpoint (e.g., a source device and/or a destination device) for communication with another endpoint device 210. For example, a first endpoint device 210 may provide information to a second endpoint device 210 (e.g., via consumer network 230 or another network).

In some implementations, the provider network includes one or more wired and/or wireless networks. For example, the provider network may include an MPLS network, a cellular network (e.g., an LTE network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), an EVPN network, a private network, an ad hoc network, an intranet, the Internet, a fiber optic-based network, a cloud computing network, and/or the like, and/or a combination of these or other types of networks.

PE device 220 includes one or more devices (e.g., one or more traffic transfer devices) capable of processing and/or transferring traffic between endpoint devices 210. For example, PE device 220 may include a firewall, a router, a gateway, a switch, a hub, a bridge, a reverse proxy, a server (e.g., a proxy server), a security device, an intrusion detection device, a load balancer, or a similar type of device.

In some implementations, PE device 220 may be a physical device implemented within a housing, such as a chassis. In some implementations, PE device 220 may be a virtual device implemented by one or more computing devices of a cloud computing environment or a data center. In practice, there may be hundreds, thousands, millions, etc. of PE devices 220.

Consumer network 230 includes a network associated with endpoint device 210 and/or PE device 220. For example, consumer network 230 may include a virtual local area network, a subnet, a wireless network, a wired network, a particular network segment (e.g., a group of networked devices connected to one or more network gateways), an Ethernet segment, a plurality of network segments, a plurality of Ethernet segments, and/or the like. In some implementations, consumer network 230 may be associated with a network segment identifier, such as an ESI or another identifier that identifies consumer network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
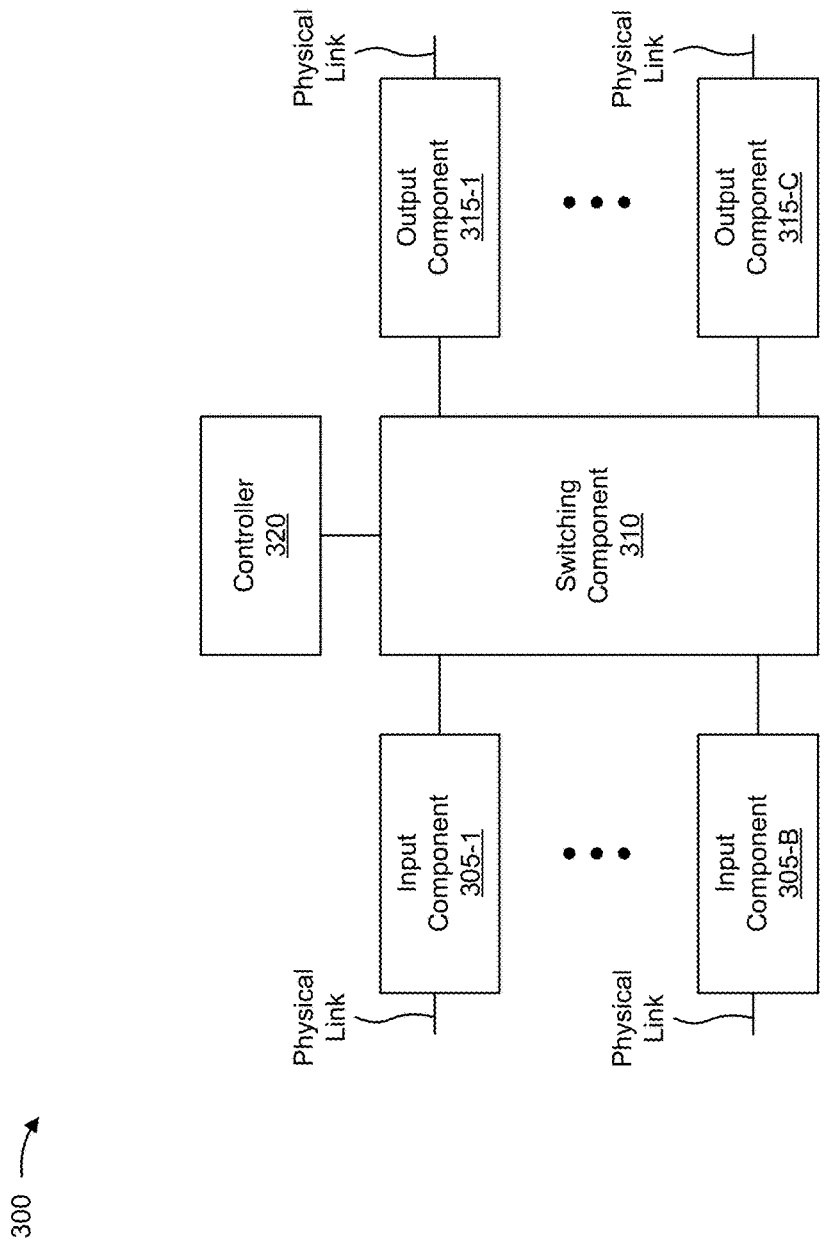
FIG. 3 is a diagram of example components of one or more devices of FIG. 2.

FIG. 3 is a diagram of example components of a device 300. Device 300 may correspond to endpoint device 210 and/or PE device 220. In some implementations, endpoint device 210 and/or PE device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C(C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
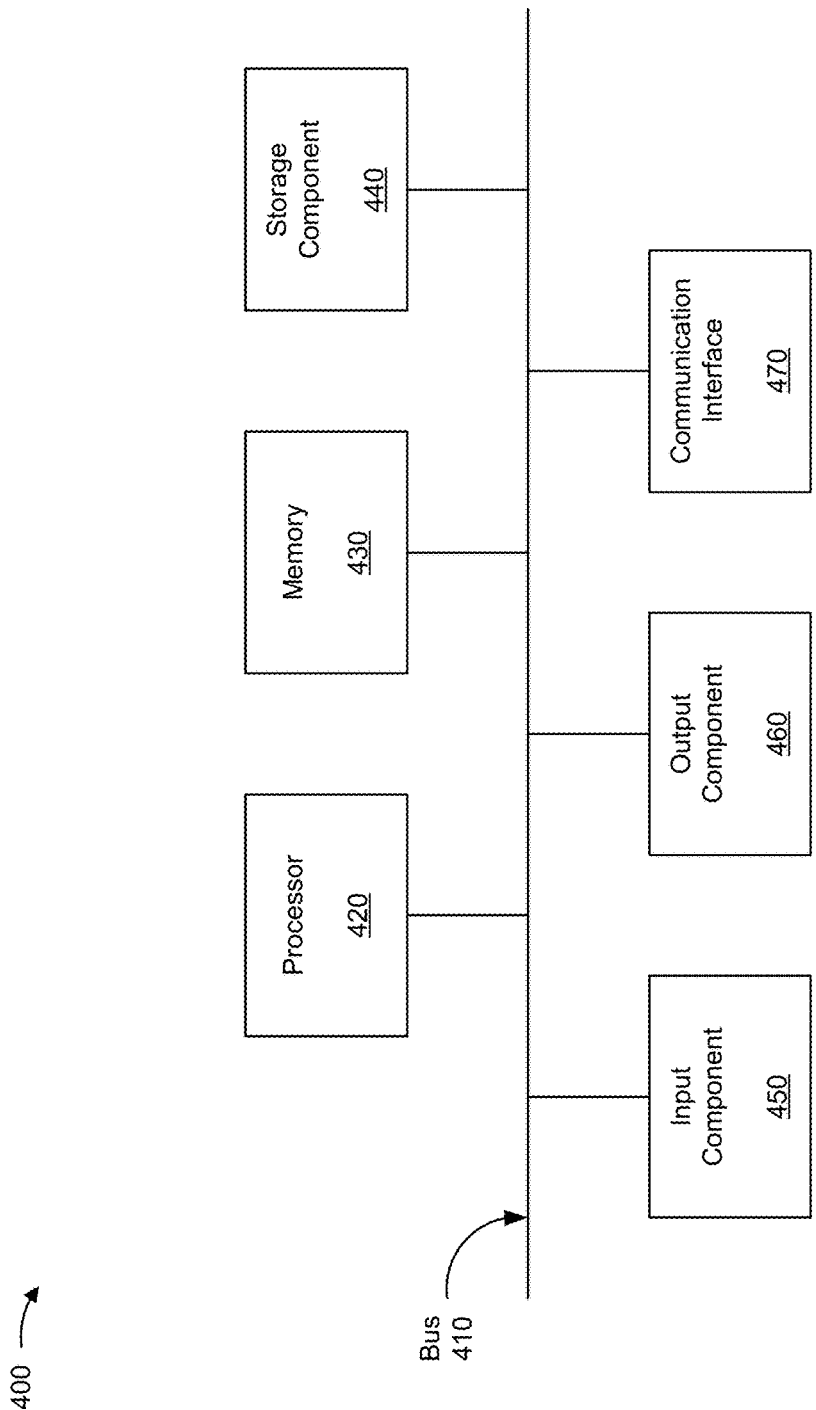
FIG. 4 is a diagram of example components of one or more devices of FIG. 2.

FIG. 4 is a diagram of example components of a device 400. Device 400 may correspond to endpoint device 210 and/or PE device 220. In some implementations, endpoint device 210 and/or PE device 220 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
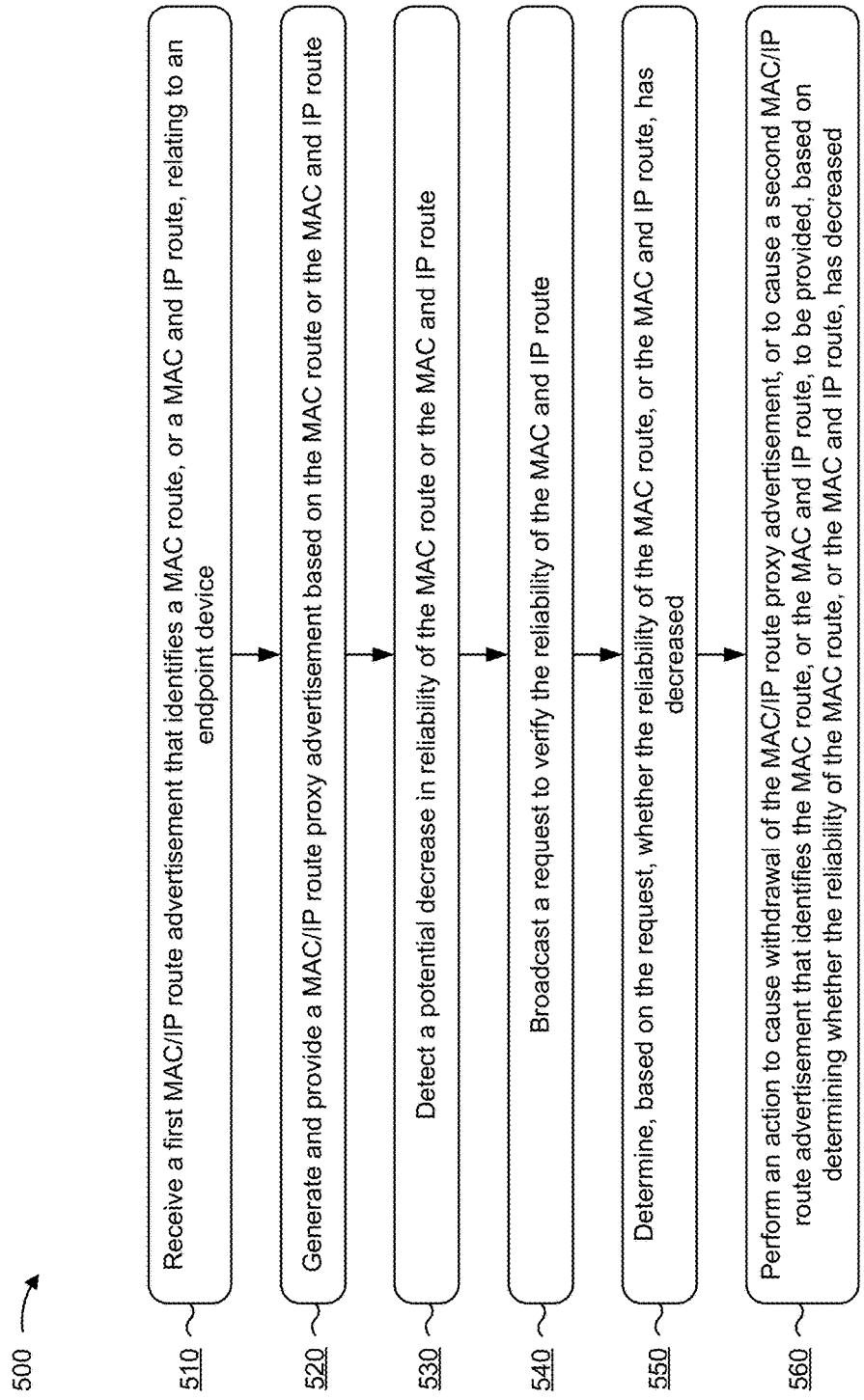
FIG. 5 is a flow chart of an example process for proxy advertising media access control (MAC)/Internet Protocol (IP) routes.

FIG. 5 is a flow chart of an example process 500 for proxy advertising MAC/IP routes. In some implementations, one or more process blocks of FIG. 5 may be performed by PE device 220. In some implementations, one or more process blocks of FIG. 5 may be performed by another device or a group of devices separate from or including PE device 220, such as endpoint device 210.

As shown in FIG. 5, process 500 may include receiving a first MAC/IP route advertisement that identifies a MAC route, or a MAC and IP route, relating to an endpoint device (block 510). For example, PE device 220 (e.g., using input component 305, switching component 310, output component 315, controller 320, and/or the like) may receive (e.g., from another PE device 220) a first MAC/IP route advertisement that identifies a MAC route, or a MAC and IP route, relating to endpoint device 210, as described above in connection with FIGS. 1A-1C.

As further shown in FIG. 5, process 500 may include generating and providing a MAC/IP route proxy advertisement based on the MAC route or the MAC and IP route (block 520). For example, PE device 220 (e.g., using input component 305, switching component 310, output component 315, controller 320, and/or the like) may generate and provide a MAC/IP route proxy advertisement based on the MAC route or the MAC and IP route, as described above in connection with FIGS. 1A-1C.

As further shown in FIG. 5, process 500 may include detecting a potential decrease in reliability of the MAC route or the MAC and IP route (block 530). For example, PE device 220 (e.g., using input component 305, switching component 310, output component 315, controller 320, and/or the like) may detect a potential decrease in reliability of the MAC route or the MAC and IP route, as described above in connection with FIGS. 1A-1C.

As further shown in FIG. 5, process 500 may include broadcasting a request to verify the reliability of the MAC route or the MAC and IP route (block 540). For example, PE device 220 (e.g., using input component 305, switching component 310, output component 315, controller 320, and/or the like) may broadcast a request to verify the reliability of the MAC and IP route, as described above in connection with FIGS. 1A-1C.

As further shown in FIG. 5, process 500 may include determining, based on the request, whether the reliability of the MAC route, or the MAC and IP route, has decreased (block 550). For example, PE device 220 (e.g., using input component 305, switching component 310, output component 315, controller 320, and/or the like) may determine, based on the request, whether the reliability of the MAC route, or the MAC and IP route, has decreased, as described above in connection with FIGS. 1A-1C.

As further shown in FIG. 5, process 500 may include performing an action to cause withdrawal of the MAC/IP route proxy advertisement, or to cause a second MAC/IP route advertisement that identifies the MAC route, or the MAC and IP route, to be provided, based on determining whether the reliability of the MAC route, or the MAC and IP route, has decreased (block 560). For example, PE device 220 (e.g., using input component 305, switching component 310, output component 315, controller 320, and/or the like) may perform an action to cause withdrawal of the MAC/IP route proxy advertisement, or to cause a second MAC/IP route advertisement that identifies the MAC route, or the MAC and IP route, to be provided, based on determining whether the reliability of the MAC route, or the MAC and IP route, has decreased, as described above in connection with FIGS. 1A-1C.

Process 500 may include additional implementations, such as any single implementation or any combination of implementations described below and/or described in connection with FIG. 6.

In some implementations, PE device 220 may perform the action to cause the second MAC/IP route advertisement to be provided based on determining that the reliability of the MAC route, or the MAC and IP route, has not decreased. In some implementations, PE device 220 may perform the action to cause withdrawal of the MAC/IP route proxy advertisement based on determining that the reliability of the MAC route, or the MAC and IP route, has decreased.

In some implementations, the MAC/IP route proxy advertisement includes a first proxy advertisement flag. In some implementations, the second MAC/IP route advertisement includes a second proxy advertisement flag that corresponds to the first proxy advertisement flag. In some implementations, PE device 220 may generate the MAC/IP route proxy advertisement by setting the first proxy advertisement flag to a first value. In some implementations, PE device 220 may generate the second MAC/IP route advertisement by setting the second proxy advertisement flag to a second value different than the first value.

In some implementations, the endpoint device (e.g., endpoint device 210) is homed to PE device 220 and to a plurality of other PE devices (e.g., other PE devices 220). In some implementations, PE device 220 may receive the first MAC/IP route advertisement from one of the plurality of other PE devices, and perform the action to cause the second MAC/IP route advertisement to be provided to the plurality of other PE devices.

In some implementations, PE device 220 may receive a first MAC/IP route advertisement that identifies a MAC route relating to a customer edge device, generate and provide a MAC/IP route proxy advertisement based on the MAC route, and detect a potential decrease in reliability of the MAC route after generating and providing the MAC/IP route proxy advertisement. In some implementations, PE device 220 may broadcast a request to verify the reliability of the MAC route after detecting the potential decrease in reliability of the MAC route, determine, based on the request, whether the reliability of the MAC route has decreased, and perform one or more actions to cause a second MAC/IP route advertisement, that identifies the MAC route, to be provided based on determining that the reliability of the MAC route has not decreased.

In some implementations, PE device 220 may receive an indication of withdrawal of the first MAC/IP route advertisement and detect the potential decrease in reliability of the MAC route based on the indication. In some implementations, PE device 220 may determine that a session, relating to another network device (e.g., another PE device 220) from which the first MAC/IP route advertisement is received, is interrupted. In some implementations, PE device 220 may detect the potential decrease in reliability of the MAC route based on determining that the session is interrupted.

In some implementations, the first MAC/IP route advertisement further identifies an ESI. In some implementations, PE device 220 may generate and provide the MAC/IP route proxy advertisement if the ESI is local to the network device. In some implementations, PE device 220 may receive the first MAC/IP route advertisement from another network device (e.g., another PE device 220). In some implementations, the customer edge device may be multi-homed to PE device 220 and the other network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 relating to process 500. In some implementations, one or more process blocks of FIG. 6 may be performed by PE device 220. In some implementations, one or more process blocks of FIG. 6 may be performed by another device or a group of devices separate from or including PE device 220, such as endpoint device 210.

As shown in FIG. 6, process 600 may include providing a first MAC/IP route advertisement that identifies a MAC route, or a MAC and IP route, relating to an endpoint device (block 610). For example, PE device 220 (e.g., using input component 305, switching component 310, output component 315, controller 320, and/or the like) may provide a first MAC/IP route advertisement that identifies a MAC route, or a MAC and IP route, relating to an endpoint device (e.g., endpoint device 210), as described above in connection with FIGS. 1A-1C.

As further shown in FIG. 6, process 600 may include determining that the MAC route, or the MAC and IP route, is aged out (block 620). For example, PE device 220 (e.g., using input component 305, switching component 310, output component 315, controller 320, and/or the like) may determine that the MAC route, or the MAC and IP route, is aged out, as described above in connection with FIGS. 1A-1C.

As further shown in FIG. 6, process 600 may include determining, based on determining that the MAC route, or the MAC and IP route, is aged out, whether a second MAC/IP route advertisement that identifies the MAC route, or the MAC and IP route, is being provided by a network device associated with the endpoint device (block 630). For example, PE device 220 (e.g., using input component 305, switching component 310, output component 315, controller 320, and/or the like) may determine, based on determining that the MAC route, or the MAC and IP route, is aged out, whether a second MAC/IP route advertisement that identifies the MAC route, or the MAC and IP route, is being provided by a network device (e.g., another PE device 220) associated with the endpoint device (e.g., endpoint device 210), as described above in connection with FIGS. 1A-1C.

As further shown in FIG. 6, process 600 may include performing an action to cause withdrawal of the first MAC/IP route advertisement, or to cause a MAC/IP route proxy advertisement relating to the MAC route, or the MAC and IP route, to be provided, based on determining whether the second MAC/IP route advertisement is being provided by the network device (block 640). For example, PE device 220 (e.g., using input component 305, switching component 310, output component 315, controller 320, and/or the like) may perform an action to cause withdrawal of the first MAC/IP route advertisement, or to cause a MAC/IP route proxy advertisement relating to the MAC route, or the MAC and IP route, to be provided, based on determining whether the second MAC/IP route advertisement is being provided by the network device (e.g., the other PE device 220), as described above in connection with FIGS. 1A-1C.

Process 600 may include additional implementations, such as any single implementation or any combination of implementations described below and/or described in connection with FIG. 5.

In some implementations, PE device 220 may determine whether a second MAC/IP route advertisement, that includes a flag that indicates that the second MAC/IP route advertisement is not a proxy advertisement, is being provided by the network device (e.g., the other PE device 220).

In some implementations, the first MAC/IP route advertisement contains a first proxy advertisement flag set to a first value. In some implementations, the MAC/IP route proxy advertisement includes a second proxy advertisement flag that is set to a second value different than the first value.

In some implementations, PE device 220 may perform the action to cause withdrawal of the first MAC/IP route advertisement based on determining that the second MAC/IP route advertisement is not being provided by the network device (e.g., the other PE device 220).

In some implementations, PE device 220 may initiate a timer, and determine that the MAC route, or the MAC and IP route, is aged out based on an expiration of the timer. In some implementations, PE device 220 may perform the action to cause the MAC/IP route proxy advertisement to be provided based on determining that the second MAC/IP route advertisement is being provided by the network device (e.g., the other PE device 220).

In some implementations, PE device 220 may determine whether a second MAC/IP route advertisement, that includes an ESI that is local to PE device 220, is being provided by the network device (e.g., the other PE device 220). In some implementations, PE device 220 may perform the action to cause the MAC/IP route proxy advertisement to be provided based on determining that a second MAC/IP route advertisement, that includes an ESI that is local to PE device 220, is being provided by the network device (e.g., the other PE device 220).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, enable a multi-homed PE device 220 that remotely learns route information relating to an endpoint device 210 to nevertheless advertise the route in a Type 2 route advertisement. To distinguish from a route advertisement in which the route is locally learned, PE device 220 is capable of adjusting a control flag (e.g., one bit)—e.g., a proxy advertisement flag—in an extended community attribute, such as a BGP extended community attribute, of the route advertisement so as to specify that the route advertisement is a proxy advertisement. A first PE device (e.g., a first PE device 220) that locally learns route information may thus set the proxy advertisement flag to one value (e.g., to '0') to indicate that the route information is locally learned by the first PE device (and thus the route advertisement is not a proxy advertisement), and a second PE device (e.g., a second PE device 220) that remotely learns the route (e.g., from the route advertisement provided by the first PE device) may set the proxy advertisement flag to another value (e.g., to '1') to indicate that the route is remotely learned by the second PE device (and thus the route advertisement is a proxy advertisement).

In this way, in a scenario where the first PE device fails, or where a link between the first PE device and the endpoint device fails, proxy advertisements from the second PE device may still continue to flow through the network, providing a grace period for PE devices on the network, such as the second PE device, to relearn (e.g., locally learn via broadcast message(s)) the route information relating to the endpoint device. This prevents PE devices (including those PE devices to which the endpoint device is not multihomed) from immediately removing or deleting route entries relating to the endpoint device (as would otherwise be the case if the first PE device is the only PE device that is advertising the route, and the first PE device fails or withdraws from advertising the route) if the route is actually still valid or active. This permits all PE devices on the network or subnet to continue to forward traffic to the endpoint device, which reduces the possibility of traffic loss, thereby improving overall network efficiency and performance. This is particularly beneficial in cases where large quantities of routes relating to numerous endpoint devices are involved, since unneeded disruption in traffic forwarding (e.g., due to widespread withdrawal of route advertisements and/or removal or deletion of route entries) would be avoided.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a communication structure for communicating information, such as a protocol data unit (PDU), a network packet, a frame, a subframe, a datagram, a segment, a message, a block, a cell, a slot, a symbol, a portion of any of the above, and/or another type of formatted or unformatted unit of data capable of being transmitted via a network.

As used herein, network traffic or traffic may refer to information communicated using a communication structure, such as a PDU, a network packet, a frame, a subframe, a datagram, a segment, a message, a block, a cell, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A provider edge device, comprising:
one or more memories; and
one or more processors to:
receive a first media access control (MAC)/Internet Protocol (IP) route advertisement,
the first MAC/IP route advertisement identifying a MAC route, or a MAC and IP route, relating to an endpoint device;
generate and provide a MAC/IP route proxy advertisement based on the MAC route or the MAC and IP route;
detect a potential decrease in reliability of the MAC route or the MAC and IP route;
broadcast a request to verify the reliability of the MAC and IP route;
determine, based on the request, whether the reliability of the MAC route, or the MAC and IP route, has decreased; and
perform an action to cause withdrawal of the MAC/IP route proxy advertisement, or to cause a second MAC/IP route advertisement that identifies the MAC route, or the MAC and IP route, to be provided, based on determining whether the reliability of the MAC route, or the MAC and IP route, has decreased.

2. The provider edge device of claim 1, wherein the one or more processors, when performing the action, are to:
perform the action to cause the second MAC/IP route advertisement to be provided based on determining that the reliability of the MAC route, or the MAC and IP route, has not decreased.

3. The provider edge device of claim 1, wherein the one or more processors, when performing the action, are to:
perform the action to cause withdrawal of the MAC/IP route proxy advertisement based on determining that the reliability of the MAC route, or the MAC and IP route, has decreased.

4. The provider edge device of claim 1, wherein the MAC/IP route proxy advertisement includes a first proxy advertisement flag; and
wherein the one or more processors, when generating the MAC/IP route proxy advertisement, are to:
set the first proxy advertisement flag to a first value.

5. The provider edge device of claim 4, wherein the second MAC/IP route advertisement includes a second proxy advertisement flag that corresponds to the first proxy advertisement flag; and
wherein the one or more processors are further to:
generate the second MAC/IP route advertisement by setting the second proxy advertisement flag to a second value different than the first value.

6. The provider edge device of claim 1, wherein the endpoint device is homed to the provider edge device and to a plurality of other provider edge devices.

7. The provider edge device of claim 6, wherein the one or more processors, when receiving the first MAC/IP route advertisement, are to:
receive the first MAC/IP route advertisement from one of the plurality of other provider edge devices; and
wherein the one or more processors, when performing the action to cause the second MAC/IP route advertisement to be provided, are to:
perform the action to cause the second MAC/IP route advertisement to be provided to the plurality of other provider edge devices.

8. A non-transitory computer-readable medium storing instructions, the instructions comprising:
one or more instructions that, when executed by one or more processors of a network device, cause the one or more processors to:
receive a first media access control (MAC)/Internet Protocol (IP) route advertisement,
the first MAC/IP route advertisement identifying a MAC route relating to a customer edge device;
generate and provide a MAC/IP route proxy advertisement based on the MAC route;
detect a potential decrease in reliability of the MAC route after generating and providing the MAC/IP route proxy advertisement;
broadcast a request to verify the reliability of the MAC route after detecting the potential decrease in reliability of the MAC route;
determine, based on the request, whether the reliability of the MAC route has decreased; and
perform one or more actions to cause a second MAC/IP route advertisement, that identifies the MAC route, to be provided based on determining that the reliability of the MAC route has not decreased.

9. The non-transitory computer-readable medium of claim 8, wherein the one or more instructions, when executed by the one or more processors, further cause the one or more processors to:
receive an indication of withdrawal of the first MAC/IP route advertisement; and
wherein the one or more instructions, that cause the one or more processors to detect the potential decrease in reliability of the MAC route, cause the one or more processors to:
detect the potential decrease in reliability of the MAC route based on the indication.

10. The non-transitory computer-readable medium of claim 8, wherein the one or more instructions, when executed by the one or more processors, further cause the one or more processors to:
determine that a session, relating to another network device from which the first MAC/IP route advertisement is received, is interrupted; and
wherein the one or more instructions, that cause the one or more processors to detect the potential decrease in reliability of the MAC route, cause the one or more processors to:
detect the potential decrease in reliability of the MAC route based on determining that the session is interrupted.

11. The non-transitory computer-readable medium of claim 8, wherein the first MAC/IP route advertisement further identifies an Ethernet segment identifier (ESI); and wherein the one or more instructions, that cause the one or more processors to generate and provide the MAC/IP route proxy advertisement, cause the one or more processors to:
  generate and provide the MAC/IP route proxy advertisement if the ESI is local to the network device.

12. The non-transitory computer-readable medium of claim 8, wherein the one or more instructions, that cause the one or more processors to receive the first MAC/IP route advertisement, cause the one or more processors to:
  receive the first MAC/IP route advertisement from another network device; and
  wherein the customer edge device is multihomed to the network device and the other network device.

13. A method, comprising:
  providing, by a first network device, a first media access control (MAC)/Internet Protocol (IP) route advertisement,
    the first MAC/IP route advertisement identifying a MAC route or a MAC and IP route,
      the MAC route, or the MAC and IP route, relating to an endpoint device;
  determining, by the first network device, that the MAC route, or the MAC and IP route, is aged out;
  determining, by the first network device and based on determining that the MAC route, or the MAC and IP route, is aged out, whether a second MAC/IP route advertisement is being provided by a second network device associated with the endpoint device,
    the second MAC/IP route advertisement identifying the MAC route or the MAC and IP route; and
  performing, by the first network device, an action to cause withdrawal of the first MAC/IP route advertisement, or to cause a MAC/IP route proxy advertisement relating to the MAC route, or the MAC and IP route, to be provided, based on determining whether the second MAC/IP route advertisement is being provided by the second network device.

14. The method of claim 13, wherein determining whether a second MAC/IP route advertisement is being provided comprises:
  determining whether a second MAC/IP route advertisement, that includes a flag that indicates that the second MAC/IP route advertisement is not a proxy advertisement, is being provided by the second network device.

15. The method of claim 13, wherein the first MAC/IP route advertisement contains a first proxy advertisement flag set to a first value; and
  wherein the MAC/IP route proxy advertisement includes a second proxy advertisement flag that is set to a second value different than the first value.

16. The method of claim 13, wherein performing the action comprises:
  performing the action to cause withdrawal of the first MAC/IP route advertisement based on determining that the second MAC/IP route advertisement is not being provided by the second network device.

17. The method of claim 13, further comprising:
  initiating a timer; and
  wherein determining that the MAC route, or the MAC and IP route, is aged out comprises:
    determining that the MAC route, or the MAC and IP route, is aged out based on an expiration of the timer.

18. The method of claim 13, wherein performing the action comprises:
  performing the action to cause the MAC/IP route proxy advertisement to be provided based on determining that the second MAC/IP route advertisement is being provided by the second network device.

19. The method of claim 13, wherein determining whether a second MAC/IP route advertisement is being provided comprises:
  determining whether a second MAC/IP route advertisement, that includes an Ethernet segment identifier (ESI) that is local to the first network device, is being provided by the second network device.

20. The method of claim 19, wherein performing the action to cause the MAC/IP route proxy advertisement to be provided comprises:
  performing the action to cause the MAC/IP route proxy advertisement to be provided based on determining that a second MAC/IP route advertisement, that includes an ESI that is local to the first network device, is being provided by the second network device.

\* \* \* \* \*